US009206881B2

(12) United States Patent
Kong et al.

(10) Patent No.: US 9,206,881 B2
(45) Date of Patent: Dec. 8, 2015

(54) RIGID SPEED REDUCER WITH INTERNAL AND EXTERNAL TOOTH PROFILE TOOTH-ENVELOPING

(71) Applicant: ZHEJIANG HENGFENGTAI REDUCER MFG. CO., LTD, Wenzhou, Zhejiang (CN)

(72) Inventors: Xiangdong Kong, Zhejiang (CN); Shengkang Ye, Zhejiang (CN)

(73) Assignee: ZHEJIANG HENGFENGTAI REDUCER MFG.CO., LTD, Wenzhou, Zhejiang (CN)

( * ) Notice: Subject to any disclaimer, the term of this patent is extended or adjusted under 35 U.S.C. 154(b) by 0 days.

(21) Appl. No.: 14/420,888

(22) PCT Filed: Mar. 2, 2013

(86) PCT No.: PCT/CN2013/072095
§ 371 (c)(1),
(2) Date: Feb. 10, 2015

(87) PCT Pub. No.: WO2014/134765
PCT Pub. Date: Sep. 12, 2014

(65) Prior Publication Data
US 2015/0219186 A1    Aug. 6, 2015

(51) Int. Cl.
*F16H 1/32* (2006.01)
*F16H 25/06* (2006.01)

(52) U.S. Cl.
CPC ............... *F16H 1/32* (2013.01); *F16H 25/06* (2013.01); *F16H 2001/325* (2013.01); *F16H 2001/327* (2013.01); *F16H 2025/063* (2013.01)

(58) Field of Classification Search
CPC ............... F16H 1/32; F16H 2001/327; F16H 2001/325; F16H 2025/063
See application file for complete search history.

(56) References Cited

U.S. PATENT DOCUMENTS

| 1,867,492 | A | * | 7/1932 | Braren | F16H 1/32 |
|---|---|---|---|---|---|
| | | | | | 475/168 |
| 4,604,916 | A | * | 8/1986 | Distin, Jr. | F16H 1/32 |
| | | | | | 475/168 |
| 8,517,878 | B2 | * | 8/2013 | Nagumo | F16H 1/32 |
| | | | | | 475/163 |

FOREIGN PATENT DOCUMENTS

| CN | 1062024 A | 6/1992 |
|---|---|---|
| CN | 1542310 A | 11/2004 |

(Continued)

*Primary Examiner* — Sherry Estremsky
(74) *Attorney, Agent, or Firm* — Christensen Fonder P.A.

(57) ABSTRACT

A rigid speed reducer with internal and external tooth profile tooth-enveloping. The rigid speed reducer includes first- and second-level speed-reducing mechanisms. The first-level speed-reducing mechanism includes: an eccentric gear; rotary arm bearing; externally-meshing curved gear; and gear pins fixed on a first supporting frame and externally meshed with the externally-meshing curved gear. The second-level speed-reducing mechanism includes: an eccentric transmission gear; rotary arm bearing; internally-meshing curved gear, which is internally meshed and fitted with the gear pin; and an output disk linked with an output shaft. The eccentric transmission gear is in transmission connection with the externally-meshing curved gear through a dowel pin. The internally-meshing curved gear is in transmission with the output disk through a transmission pin. A first reinforcing frame is arranged at one side of the externally-meshing curved gear, and a second reinforcing frame is arranged at one side of the internally-meshing curved gear.

9 Claims, 3 Drawing Sheets

(56) References Cited

FOREIGN PATENT DOCUMENTS

| | | |
|---|---|---|
| CN | 202228645 U | 5/2012 |
| CN | 103122973 A | 5/2013 |
| CN | 203130926 U | 8/2013 |
| JP | 2000-81098 A | 3/2000 |

* cited by examiner

RIGID SPEED REDUCER WITH INTERNAL
AND EXTERNAL TOOTH PROFILE
TOOTH-ENVELOPING

RELATED APPLICATIONS

The present application is a National Phase entry of PCT Application No. PCT/CN2013/0720955, filed Mar. 2, 2013, the disclosure of which is hereby incorporated by reference herein in its entirety.

FIELD OF THE INVENTION

The invention relates to a small-tooth-difference speed reducer for industrial use, and belongs to the technical field of a speed reducer. The invention is subsidized by "National High-tech R&D Program (863 Program)".

BACKGROUND OF THE INVENTION

Speed reducers for use in the field of a robot are mainly classified into two kinds: a harmonic speed reducer and a cycloidal pin gear speed reducer. The harmonic speed reducer, which was used as a main device for transmission of a robot, realizes speed-reduction motion through elastic deformation of a flexible gear, which has larger elastic deformation and also has a large elastic return difference caused thereby, thus inevitably affecting the accuracy of motion of the robot. In the case of transmitting a larger load, meshing of a deformative flexible gear and a rigid gear is not conjugate tooth profile meshing, thus the service life for ensuring the precision is short, and the meshing of the deformative flexible gear and the rigid gear can only be applied on a light-load robot or middle-light-load robot instead of a heavy-load robot. Compared with the harmonic transmission speed reducer, a Japanese Rotary Vector (simply called RV) speed reducer has a series of advantages of a small size, light weight, a large transmission ratio, large rigidity, high precision and efficiency, smooth operation, small return difference, high motion precision, and the like, and is applicable for use in a heavy-load robot. The newest Japanese product of a RV speed reducer allows, through alternation of an external ring of a bearing, the size of the speed reducer to be further reduced, and consequently a body interface of the robot also becomes small, which represents a trend that the speed reducer for use in the robot is developed in a smaller and better direction. However, in the case that the size of the speed reducer is constant, a transmission ratio of the RV speed reducer increases as the number of teeth of a pin gear, and dimensions of a cycloidal single tooth and a gear pin become small, which affects the further improvement of load-bearing capacity of the speed reducer. Moreover, the RV speed reducer is high in machining precision requirement and cost, which restricts popularization and application of the RV speed reducer. Particularly, it is very difficult to meet machining precision with which two eccentric shafts are disposed at a difference of 180 degree, however the precision of the RV speed reducer directly affects transmission precision and efficiency of the speed reducer. A large speed ratio of the RV speed reducer comes from planetary speed-reduction motion and cycloidal pin gear speed-reduction motion of the RV speed reducer, which form composite two-level speed-reduction, and large speed-reduction ratio may be realized with series connection of Japanese FA speed reducers or series connection of other speed-reducing devices, but the axial dimension is multiplied as the series connection of the speed reducer, which can not meet the requirement of small size, high rigidity, and high efficient load-bearing with respect to the speed reducer for use in the robot. Therefore, the reducer with a less teeth number, a large speed ratio, a small size, high load-bearing, high efficiency, and long service life is a bottleneck that the robot is developed in a direction of a small size, high efficiency, and high load-bearing, which needs to be solved urgently.

SUMMARY OF THE INVENTION

An objective of the invention is to provide, through adding two enforcing frames which are linked with an output motion gear, a speed reducer with high rigidity, a small teeth number, a large speed ratio, a small size, high load-bearing, high efficiency, and long service life, to solve the above problem. The speed reducer is particularly applicable as a speed reducer for use in a heavy load robot, the size and weight of the speed reducer is effectively reduced in the case of ensuring the less teeth number, the large speed ratio, the high efficiency, and the high load-bearing, and the speed reducer is easily industrialized and seriated.

The technical solution of the invention is a rigid speed reducer with internal and external tooth profile tooth-enveloping, including: a first supporting frame (9); a second supporting frame (10), forming an accommodating cavity with the first supporting frame (9); an input shaft (1), mounted on the first supporting frame (9) through a first supporting bearing (3); an output shaft (20), mounted on the second supporting frame (10); and a first-level speed-reducing mechanism and a second-level speed-reducing mechanism, which are mounted in an accommodating cavity, wherein, the first-level speed-reducing mechanism includes: an eccentric gear (101), arranged on the input shaft (1); a first rotary arm bearing (5), sheathed on the eccentric gear (101); an externally meshing curved gear (7), sheathed on the first rotary arm bearing (5); and gear pins (8), fixed on the first supporting frame (9), and externally meshed with the externally meshing curved gear (7); the second-level speed-reducing mechanism includes: an eccentric transmission gear (14), mounted on the input shaft (1) through a second supporting bearing (17); a second rotary arm bearing (13), sheathed on the eccentric transmission gear (14); an internally meshing curved gear (11), sheathed on the second rotary arm bearing (13), and internally meshed and fitted with the gear pins (8); and an output disk (16), in linkage connection with the output shaft (20); the eccentric transmission gear (14) is in transmission connection with the externally meshing curved gear (7) through a dowel pin (26), the internally meshing curved gear (11) is in transmission connection with the output disk (16) through a transmission pin (24); the number of the gear pins (8) is less than the number of teeth of the internally meshing curved gear (11) and greater than the number of teeth of the externally meshing curved gear (7); a first reinforcing frame (6) is arranged at one side of the externally meshing curved gear (7) near the first supporting frame (9), the first reinforcing frame (6) is mounted on the input shaft (1) through a first bearing (4), multiple convex platforms (61) are arranged on the first reinforcing frame (6), the externally meshing curved gear (7) is correspondingly provided with multiple through-holes (71), the convex platforms (61) of the first reinforcing frame (6) pass through the through-holes (71) and are fixedly connected to the eccentric transmission gear (14), the externally meshing curved gear (7) is never in contact with the convex platforms (61) in the process of motion; and a second reinforcing frame (23) is also arranged at one side of the internally meshing curved gear (11), the second reinforcing frame (23) is mounted on the eccentric transmission gear (14) through a second bearing (25), multiple convex platforms (231) are also arranged on the second reinforcing frame (23), multiple through-holes (111) are correspondingly arranged on the internally meshing curved gear (11), the convex platforms (231) of the second reinforcing frame (23) pass through the through-holes (111) and are fixedly connected to the output disk (16), and the internally meshing curved gear (11) is never in contact with the convex platforms (231) in the process of motion.

As a preferred embodiment of the invention, the number of the convex platforms (61, 231) on each of the first reinforcing frame (6) and the second reinforcing frame (23) is three, and the convex platforms (61, 231) are distributed circumferentially and uniformly by taking an axis of the input shaft as a center.

As a preferred embodiment of the invention, a convex shoulder (141) coaxial with the input shaft (1) is arranged on the eccentric transmission gear (14), and a third supporting bearing (15) is arranged between the convex shoulder (141) and the output disk (16).

As a preferred embodiment of the invention, the number of the gear pins (8) is greater than the number of teeth of the externally meshing curved gear (7) by one, and the number of teeth of the internally meshing curved gear (11) is greater than the number of the gear pin (8) by one.

As a preferred embodiment of the invention, the output disk (16) and the output shaft (20) are integrally arranged.

As a preferred embodiment of the invention, the eccentric gear (101) and the input shaft (1) are integrally arranged.

As a preferred embodiment of the invention, one end of the transmission pin (24) is fixed on the output disk (16), the other end of the transmission pin (24) penetrates on the internally meshing curved gear (11), and a transmission pin check ring (22) corresponding to the transmission pin (24) is arranged on an end face of the output disk (16).

As a preferred embodiment of the invention, a first sealing check ring (2) is arranged between an end side of the first supporting frame (9) and the input shaft (1).

As a preferred embodiment of the invention, a second sealing check ring (19) is arranged between an end side of the second supporting frame (10) and the output shaft (20).

Compared with the prior art, the invention has the following beneficial effects. According to the invention, large speed ratio speed-reduction motion is realized through meshing the tooth profiles of the internally and externally meshing curved gears, between which there is a small tooth difference, with the same fixed gear pins; since the same group of gear pins are shared in two-level reduction, the axial dimension of the speed reducer is reduced greatly compared with the dimension of the traditional simple series connection of two one-level speed reducers; and since one of force directions of the externally meshing curved gear and the internally meshing curved gear is outward in normal directions for which the gear pin is meshed with and tangent to the curved gears and the other one of the force directions is inward in the normal directions, it can be realized that meshing force for the internally and externally meshing curved gears is offset partially, which improves the load-bearing capacity and transmission efficiency of the speed reducer, eliminates that two eccentric gears of the RV speed reducer have to be disposed eccentrically at the difference of 180 degree, and thus also eliminates a requirement that two eccentric shaft sections are disposed on the eccentric shaft at a difference of 180 degree. According to the invention, only one eccentric gear arranged on the eccentric shaft is used for each level of speed-reduction of the speed reducer, and only two separate single eccentric gears are used for two-level reduction to enable realizing that the speed reducer is subjected to even force, thus structurally reducing, compared with the RV speed reducer, one cycloid gear and also one eccentric shaft section that has higher machining precision and has to meet bias of 180 degree, which not only reduces the axial dimension and loses the weight of the speed reducer, but also simplifies greatly the machining process and fabricating cost of the eccentric shaft and is easy to realize industrialization. In addition, the RV speed reducer uses composite two-level speed-reduction formed of planetary speed-reduction transmission and small-tooth-difference cycloidal pin gear speed-reduction, and compared with the two-level reduction having two small-tooth-differences, as for the same speed-reduction ratio, the number of teeth of the speed reducer according to the invention is far less than that of the RV speed reducer. For example, a planetary speed-reducing part of a RV40EQ speed reducer includes gears which respectively have 16 and 32 teeth, a cycloidal pin gear speed-reducing part of the RV40EQ speed reducer includes a cycloidal gear having 39 teeth and a pin gear having 40 teeth, and the total speed-reduction ratio is 81; and similarly to a transmission ratio of 80, for use in the invention, the internally meshing curved gear and the externally meshing curved gear respectively have 8 and 10 teeth, the pin gear has 9 teeth, and a total of 18 teeth of the curved gears and 9 teeth of the pin gear is used for the two-level speed-reduction, however 39 teeth of a pin gear and 87 teeth are to be used for RV two-level speed-reduction. As for the same size of speed reducer, the gear pins and the curved gears according to the invention can be made fat and thick, and can have strong rigidity. Particularly, the rigidity of the whole mechanism according to the invention is further improved after the enforcing frames are arranged additionally, that is, as for the same transmission ratio, the invention not only has high rigidity, a less tooth number, high load-bearing, and high efficiency, but also simplifies greatly the machining process and difficulty of the eccentric shaft, reduces the fabricating cost, is easy to realize industrialization, and is particularly applicable as a speed reducer for use in a heavy load robot, which has practical requirements of high rigidity, a small size, high load-bearing, high efficiency, and long service life for the speed reducer.

DETAILED DESCRIPTION OF THE INVENTION

The invention is further explained below in conjunction with the drawings and embodiments.

Figure 1:
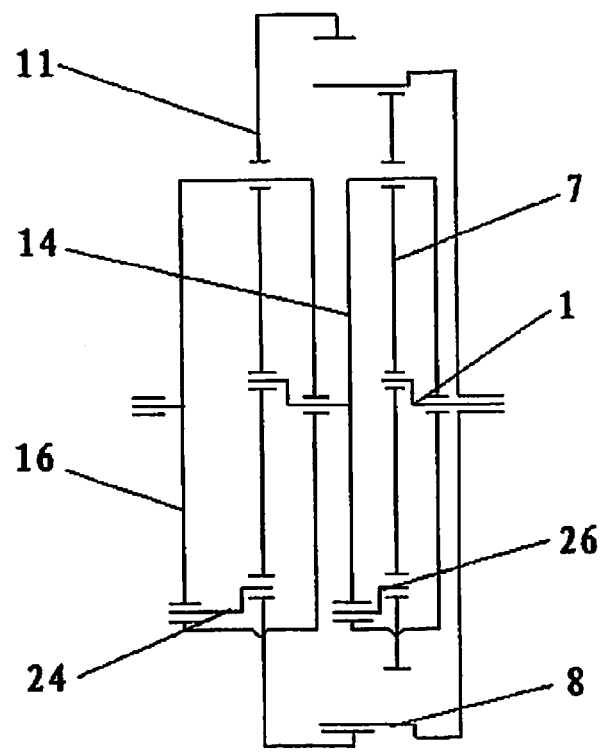
FIG. 1 is a principle diagram of transmission of a mechanism according to the invention.
Figure 2:
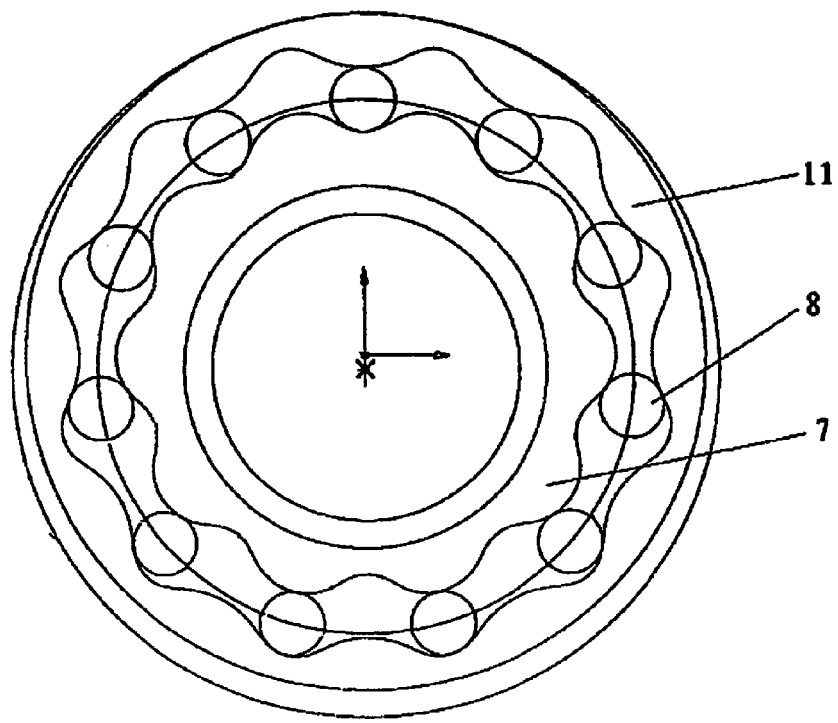
FIG. 2 is a schematic diagram in which an internally meshing curved gear and an externally meshing curved gear are meshed with gear pins according to the invention.
Figure 3:
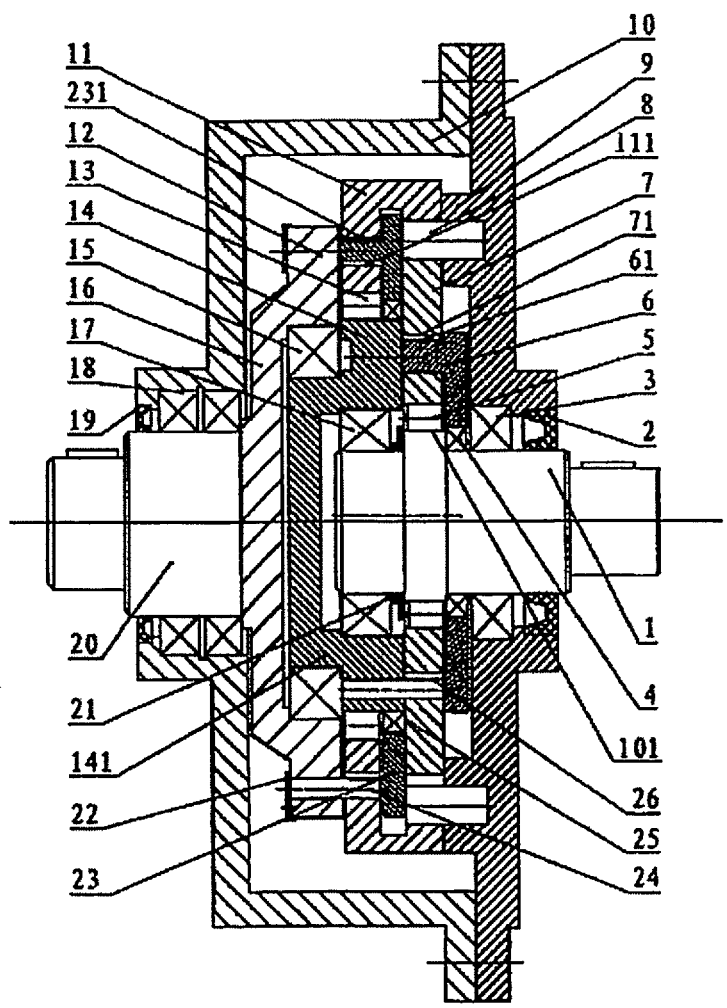
FIG. 3 is a schematic diagram of an embodiment according to the invention.
Figure 4:
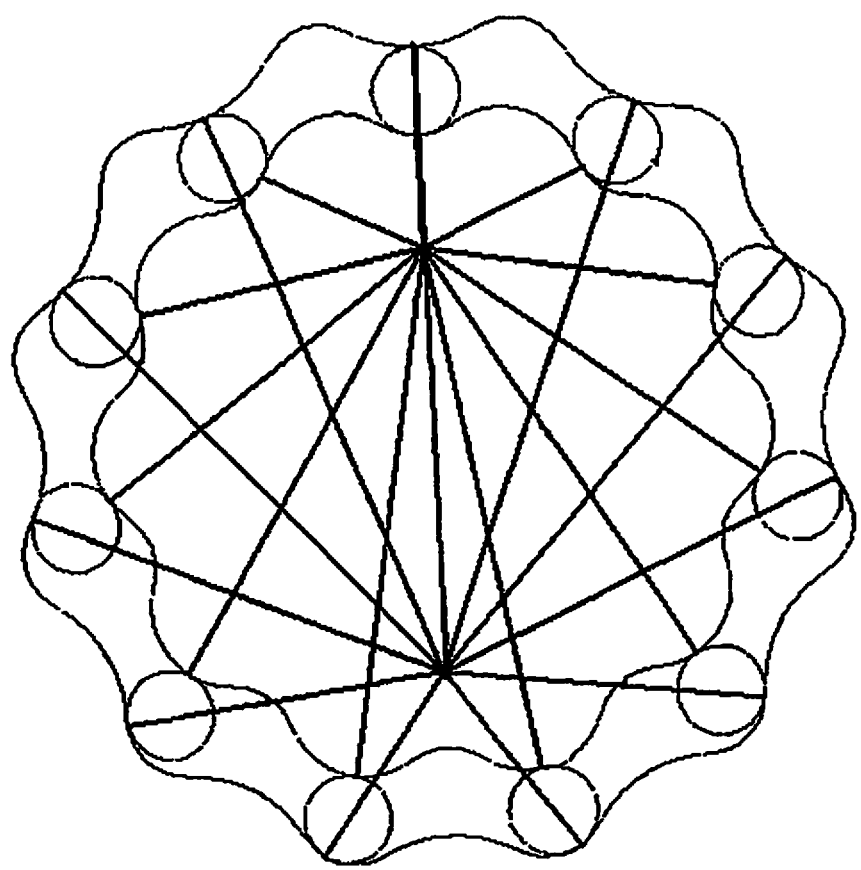
FIG. 4 is a schematic diagram of force action lines in the case that an internally meshing curved gear and an externally meshing curved gear are meshed with gear pins according to the invention.

As shown in FIGS. 1 to 4, embodiments of a rigid speed reducer with internal and external tooth profile tooth-enveloping according to the invention include a first supporting frame 9 and a second supporting frame 10, which form an accommodating cavity; an input shaft 1 having an eccentric gear is arranged on the first supporting frame, and is mounted on the first supporting frame 9 through a first supporting bearing 3; an output shaft 20 is arranged on the second supporting frame 10, a part on the output shaft 20 which is located in the accommodating cavity is a output disk 16, the output shaft 20 is mounted on the second supporting frame 10 through a fourth supporting bearing 18; a first-level speed-reducing mechanism and a second-level speed-reducing mechanism are arranged in the accommodating cavity, wherein, the first-level speed-reducing mechanism includes an eccentric gear 101, a first rotary arm bearing 5 arranged on the eccentric gear 101, an externally meshing curved gear 7 sheathed on the first rotary arm bearing 5, and gear pins 8 fixed on the first supporting frame 9 and externally meshed with the externally meshing curved gear 7, and the second-level speed-reducing mechanism includes an eccentric transmission gear 14 mounted on the input shaft 1 through a second supporting bearing 17, a second rotary arm bearing 13 sheathed on the eccentric transmission gear 14, an internally meshing curved gear 11 sheathed on the second rotary arm bearing 13 and internally meshed and fitted with the gear pins 8, the out disk 16, a dowel pin 26, and a transmission pin 24; a first reinforcing frame 6 is arranged at one side of the externally meshing curved gear 7 near the first supporting frame 9, the first reinforcing frame 6 is mounted on the input shaft 1 through a first bearing 4, multiple convex platforms 61 are arranged on the first reinforcing frame 6, the externally meshing curved gear 7 is correspondingly provided with multiple through-holes 71, the convex platforms 61 of the first reinforcing frame 6 pass through the through-holes 71 and are fixedly connected to the eccentric transmission gear 14, the externally meshing curved gear 7 is never in contact with the convex platforms 61 in the process of motion; and a second reinforcing frame 23 is also arranged at one side of the internally meshing curved gear 11, the second reinforcing frame 23 is mounted on the eccentric transmission gear 14 through a second bearing 25, multiple convex platforms 231 are also arranged on the second reinforcing frame 23, multiple through-holes 111 are correspondingly arranged on the internally meshing curved gear 11, the convex platforms 231 of the second reinforcing frame 23 pass through the through-holes 111 and are fixedly connected to the output disk 16, and the internally meshing curved gear 11 is never in contact with the convex platforms 231 in the process of motion.

The number of the convex platforms 61, 231 on each of the first reinforcing frame 6 and the second reinforcing frame 23 is three, and the convex platforms 61, 231 are distributed circumferentially and uniformly by taking an axis of the input shaft as a center.

In the illustration, a convex shoulder 141 coaxial with the input shaft 1 is arranged on the eccentric transmission gear 14, and a third supporting bearing 15 is arranged between the convex shoulder 141 and the output disk 16. The running stability and reliability of the output disk and the eccentric transmission gear 14 can be improved through additionally arranging the convex shoulder 141 and the third supporting bearing 15.

A running process of the embodiment according to the invention is as follows: the input shaft 1 drives, through the eccentric gear 101 and via the supporting bearing 3 and the first rotary arm bearing 5, the externally meshing curved gear 7 to mesh with the gear pins 8, thus realizing first-level speed-reduction; the dowel pin 26 on the externally meshing curved gear 7 transmits the speed-reduction motion to the eccentric transmission gear 14 on the second supporting bearing 17 (the eccentric transmission gear 14 is linked with the first enforcing frame 6), and the eccentric transmission gear 14 drives, via the second rotary arm bearing 13, the internally meshing curved gear 11 to mesh again with the gear pins 8, thus realizing the second-level speed-reduction; the transmission pin 24 on the internally meshing curved gear 11 transmits the motion to the output disk 16 and the output shaft 20 which are on the third supporting bearing 15 and the fourth supporting bearing 18 (the output disk 16 is linked with the second enforcing frame 23), thus outputting the speed-reduction motion.

In the embodiments, between the tooth number of the internally meshing curved gear and the number of the gear pins, and between the number of the gear pins and the tooth number of the externally meshing curved gear, there is a difference of 1 respectively, that is, each level of speed-reduction of the two-level speed-reduction is one-tooth-difference speed-reduction.

In the illustrated embodiments, one end of the transmission pin 24 is fixed on the output disk 16, the other end of the transmission pin 24 penetrates on the internally meshing curved gear 11, and a transmission pin check ring 22 corresponding to the transmission pin 24 is arranged on an end face of the output disk 16. In this way, one end of the transmission pin 24 is stopped by the transmission pin check ring 22, and the other end of the transmission pin 24 is stopped by the second enforcing frame 23, thus enabling ensuring the transmission pin 24 not to separate axially in the running process. Neither does the dowel pin 26 separate axially in the running process, because two ends of the dowel pin 26 have gears for the third supporting bearing 15 and the first enforcing frame 6.

In the figures, a first sealing check ring 2 is arranged between an end side of the first supporting frame 9 and the input shaft 1, and a second sealing check ring 19 is arranged between an end side of the second supporting frame 10 and the output shaft 20.

In the embodiments, a ball bearing is generally used as each of the supporting bearings, and a cylindrical roller bearing is generally used as each of the rotary arm bearings. However selection of each of the bearings is not limited thereto.

In the above embodiments, sleeves may be additionally arranged on the gear pins such that the internally meshing curved gear 11 and the externally meshing curved gear 7 are first meshed with the sleeves, and accordingly sliding fit is changed into rolling fit in the process of motion, thus allowing the friction force of the motion to be smaller; and sleeves may be additionally arranged on the dowel pin and the transmission pin, or the dowel pin and the transmission pin may be composed of the same eccentric pin with the eccentric gear, and through the sleeves, sliding fit is accordingly changed into rolling fit in the case of transmission, thus allowing the friction force to be smaller. And the input shaft may also use a hollow type.

In a word, the above embodiments only describe the preferred embodiments of the rigid speed reducer with internal and external tooth profile tooth-enveloping according to the invention, and do not limit the concept and scope of the invention. And under a premise of not deviating from the solution of the invention, various appearance variation and modification, which are made to the technical solution of the invention by those skilled in the art, should fall into the scope of protection of the rigid speed reducer with internal and external tooth profile tooth-enveloping according to the invention.

The invention claimed is:
1. A rigid speed reducer with internal and external tooth profile tooth-enveloping, comprising:
   a first supporting frame;
   a second supporting frame, forming an accommodating cavity with the first supporting frame;

an input shaft, mounted on the first supporting frame through a first supporting bearing;
an output shaft, mounted on the second supporting frame; and
a first-level speed-reducing mechanism and a second-level speed-reducing mechanism, which are mounted in an accommodating cavity, wherein,
the first-level speed-reducing mechanism comprises:
an eccentric gear, arranged on the input shaft;
a first rotary arm bearing, sheathed on the eccentric gear;
an externally meshing curved gear, sheathed on the first rotary arm bearing; and
gear pins, fixed on the first supporting frame, and externally meshed with the externally meshing curved gear;
the second-level speed-reducing mechanism comprises:
an eccentric transmission gear, mounted on the input shaft through a second supporting bearing;
a second rotary arm bearing, sheathed on the eccentric transmission gear;
an internally meshing curved gear, sheathed on the second rotary arm bearing, and internally meshed and fitted with the gear pins; and
an output disk, in linkage connection with the output shaft;
the eccentric transmission gear is in transmission connection with the externally meshing curved gear through a dowel pin, the internally meshing curved gear is in transmission connection with the output disk through a transmission pin;
the number of the gear pins is less than the number of teeth of the internally meshing curved gear and greater than the number of teeth of the externally meshing curved gear;
a first reinforcing frame is arranged at one side of the externally meshing curved gear near the first supporting frame, the first reinforcing frame is mounted on the input shaft through a first bearing, multiple convex platforms are arranged on the first reinforcing frame, the externally meshing curved gear is correspondingly provided with multiple through-holes, the convex platforms of the first reinforcing frame pass through the through-holes and are fixedly connected to the eccentric transmission gear, the externally meshing curved gear is never in contact with the convex platforms in the process of motion; and
a second reinforcing frame is also arranged at one side of the internally meshing curved gear, the second reinforcing frame is mounted on the eccentric transmission gear through a second bearing, multiple convex platforms are also arranged on the second reinforcing frame, multiple through-holes are correspondingly arranged on the internally meshing curved gear, the convex platforms of the second reinforcing frame pass through the through-holes and are fixedly connected to the output disk, and the internally meshing curved gear is never in contact with the convex platforms in the process of motion.

2. The rigid speed reducer with internal and external tooth profile tooth-enveloping according to claim 1, wherein, the number of the convex platforms on each of the first reinforcing frame and the second reinforcing frame is three, and the convex platforms are distributed circumferentially and uniformly by taking an axis of the input shaft as a center.

3. The rigid speed reducer with internal and external tooth profile tooth-enveloping according to claim 1, wherein, a convex shoulder coaxial with the input shaft is arranged on the eccentric transmission gear, and a third supporting bearing is arranged between the convex shoulder and the output disk.

4. The rigid speed reducer with internal and external tooth profile tooth-enveloping according to claim 1, wherein, the number of the gear pins is greater than the number of teeth of the externally meshing curved gear by one, and the number of teeth of the internally meshing curved gear is greater than the number of the gear pin by one.

5. The rigid speed reducer with internal and external tooth profile tooth-enveloping according to claim 1, wherein, the output disk and the output shaft are integrally arranged.

6. The rigid speed reducer with internal and external tooth profile tooth-enveloping according to claim 1, wherein, the eccentric gear and the input shaft are integrally arranged.

7. The rigid speed reducer with internal and external tooth profile tooth-enveloping according to claim 1, wherein, one end of the transmission pin is fixed on the output disk, the other end of the transmission pin penetrates on the internally meshing curved gear, and a transmission pin check ring corresponding to the transmission pin is arranged on an end face of the output disk.

8. The rigid speed reducer with internal and external tooth profile tooth-enveloping according to claim 1, wherein, a first sealing check ring is arranged between an end side of the first supporting frame and the input shaft.

9. The rigid speed reducer with internal and external tooth profile tooth-enveloping according to claim 1, wherein, a second sealing check ring is arranged between an end side of the second supporting frame and the output shaft.

* * * * *